(12) United States Patent
Bitterlich

(10) Patent No.: US 8,180,898 B2
(45) Date of Patent: May 15, 2012

(54) METHOD FOR DISTRIBUTION OF DATA UPON REQUEST AND CORRESPONDING DATA NETWORK

(75) Inventor: Jean-Yves Bitterlich, München (DE)

(73) Assignee: Siemens Enterprises Communications GmbH & Co. KG, Munich (DE)

( * ) Notice: Subject to any disclaimer, the term of this patent is extended or adjusted under 35 U.S.C. 154(b) by 725 days.

(21) Appl. No.: 11/664,176

(22) PCT Filed: Sep. 22, 2005

(86) PCT No.: PCT/EP2005/054745
§ 371 (c)(1),
(2), (4) Date: Mar. 29, 2007

(87) PCT Pub. No.: WO2006/034988
PCT Pub. Date: Apr. 6, 2006

(65) Prior Publication Data
US 2007/0271327 A1    Nov. 22, 2007

(30) Foreign Application Priority Data

Sep. 29, 2004    (DE) .......................... 10 2004 047 366

(51) Int. Cl.
*G06F 15/16*    (2006.01)
(52) U.S. Cl. ....................................... 709/227; 709/202
(58) Field of Classification Search .................. 709/238, 709/227
See application file for complete search history.

(56) References Cited

U.S. PATENT DOCUMENTS

| 5,790,536 A | 8/1998 | Mahany et al. |
| 5,909,437 A | 6/1999 | Rhodes et al. |
| 6,378,069 B1 | 4/2002 | Sandler et al. |
| 2002/0059400 A1* | 5/2002 | Ikami et al. .................... 709/219 |
| 2002/0165945 A1* | 11/2002 | Buswell et al. ............... 709/221 |
| 2003/0022663 A1 | 1/2003 | Rajaram et al. |
| 2003/0033525 A1 | 2/2003 | Rajaram |
| 2003/0064717 A1 | 4/2003 | Rajaram |
| 2004/0068567 A1* | 4/2004 | Moran et al. .................. 709/227 |

FOREIGN PATENT DOCUMENTS

| DE | 103 19 317 A1 | 12/2004 |
| DE | 103 53 851 A1 | 6/2005 |
| EP | 1 347 623 A1 | 9/2003 |
| EP | 1 398 910 A1 | 3/2004 |
| EP | 1 401 224 A1 | 3/2004 |
| WO | WO 00/42795 A1 | 7/2000 |
| WO | WO 02/078284 A2 | 10/2002 |

OTHER PUBLICATIONS

Moessner K. et al. "Software download enabling terminal reconfigurability"; Annales des Telecommunications; May 2002; pp. 457-479; vol. 57; No. 5/6; XP 001122781, ISSN 0003-4347; Paris, France.

Wei H-Y et al.; "Two-Hop-Relay Architecture for Next-Generation WWAN/WLAN Integration"; IEEE Wireless Communications, Apr. 2004; pp. 24-30; vol. 11 No. 2; XP001196396; ISSN 1536-1284; Piscataway, NJ, US.

\* cited by examiner

*Primary Examiner* — Ian N Moore
*Assistant Examiner* — Afshawn Towfighi

(57) ABSTRACT

In one aspect, a data network is provided. The data network includes a first user and a second user, a central device, data and a spontaneous communication connection. The first and second users are each ad hoc capable. The central device provides a distribution of data such that data is transmitted from the central device to the first user. The spontaneous communication connection is established between the first and second users and the data is transmitted directly from the first user to the second user via the spontaneous communication connection.

20 Claims, 1 Drawing Sheet

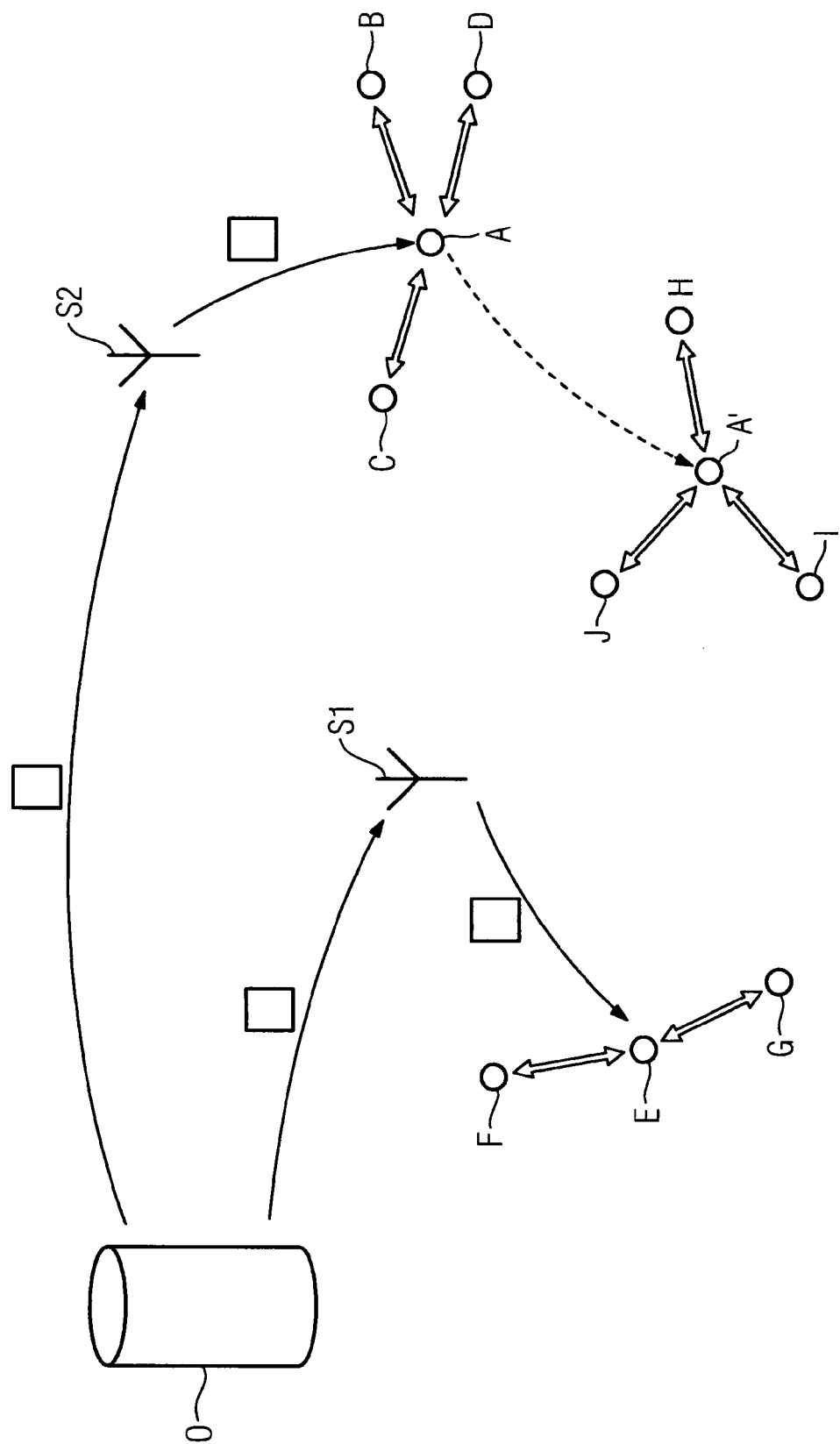

METHOD FOR DISTRIBUTION OF DATA UPON REQUEST AND CORRESPONDING DATA NETWORK

CROSS REFERENCE TO RELATED APPLICATIONS

This application is the US National Stage of International Application No. PCT/EP2005/054745, filed Aug. 22, 2005 and claims the benefit thereof. The International Application claims the benefits of German application No. 102004047366.8 DE filed Sep. 29, 2004, both of the applications are incorporated by reference herein in their entirety.

FIELD OF INVENTION

The present invention relates to a method for distribution of data, especially software and/or configuration data, in a data network with a number of users who have ad-hoc networking capabilities. In addition the present invention relates to a corresponding data network with users who have ad-hoc networking capabilities and a central device for distribution of the data.

BACKGROUND OF INVENTION

Software administration plays a central role for any mobile radio network provider or network operator. With several million users the providers or operators are confronted with an enormous problem: The changing and updating of configurations is to be able to be undertaken at all terminals simultaneously or within a time frame for which oversight is possible. While the standards bodies concentrate on how the updating and changing of the configurations is to be managed on the network side and executed on terminal side, the process to be employed by network providers and operators for handling the multiplicity of triggers and connections for updates and changes has basically been left open.

For software management in accordance with "SyncML/DM", a standard of the OMA, the software is distributed if necessary with the aid of an SMS trigger. The operator sends an SMS to millions of terminals in order to trigger them or to request them to contact a configuration management server. This solution is however very expensive and requires a very high bandwidth.

In the "Enterprise Networking" data network there are a number of SNMP-based solutions corresponding to a standard of the IETF.

SUMMARY OF INVENTION

In this case individual stations react to specific multicast or broadcast packets. This solution is useful with small networks, but is not worthwhile for a network of the size of mobile radio operators.

An object of the present invention is thus to provide a method with which an update or change of the configurations of a plurality of terminals can be undertaken more easily. In addition a corresponding data network is to be specified.

In accordance with the invention this object is achieved by a method of distributing data, especially software and/or configuration data, in a data network with a number of users who have ad-hoc networking capabilities, by sending the data from a central location to a first of the number of users, establishing a spontaneous communication link between the first and a second user and by the second user requesting the data or a part thereof.

In addition there is provision according to the invention for a data network with at least one first and one second user who have ad-hoc networking capabilities, and a central device for distributing data, especially software and/or configuration data, with the data able to be transmitted by the central device to the first user, a spontaneous communication link able to be established between the first and second user and the data or parts thereof being able to be requested directly from the first user by the second user via the spontaneous communication link.

Advantageously this makes it possible for the network providers and operators to no longer have to trigger all devices or users for updating and changing the configurations or software. They merely have to send software or configuration data to a subset of users, preferably in selected radio cells. The data is further distributed by spontaneous communication, i.e. ad-hoc networks. This saves energy and bandwidth and consequently money.

The request for the data or a part thereof by the second user and the subsequent transmission of the data by the first user can be undertaken automatically when the two users establish the spontaneous communication or the ad hoc-network. This means that the second user is the active part and the first user merely has to check whether they have the requested data available in order to send it. This pull method is especially advantageous for procuring the data for a first initialization of a device. If the new device has been purchased from a specific network operator, it will attempt when switched on to obtain all network operator configuration parameters and possibly other updating data from adjacent terminals, which are also routed via the same network operator. The requested data is for example WAP data, GPRS data, time information, date information and other parameters. This self-configuration is especially useful for the network operator since there is then no need for their active involvement.

As soon as one of the number of users has a complete data set available, their installation or setup can be started. This means that the user does not have to bother with installations and setups.

Preferably the spontaneous communication is checked with a security facility. To this end a signature of the central location or of the operator or of a device manufacturer can be communicated from mobile telephones for example. In this way an enhanced security as regards the authenticity of the data can be guaranteed for installation procedures.

The spontaneous communication can be established by means of Bluetooth, wireless USB or WLAN. This allows the process to be based on known standards.

BRIEF DESCRIPTION OF THE DRAWINGS

The present invention will now be explained in greater detail with reference to the enclosed drawing, which basically reflects an inventive data network.

DETAILED DESCRIPTION OF INVENTION

The exemplary embodiment described in greater detail below represents a preferred embodiment of the present invention.

The inventive solution is based on a P2P (peer-to-peer) software management distribution principle. In this case data needed for updating or changing the software or configuration is sent from a central point over a wide-area data network to "selected" devices and subsequently via ad-hoc networks through spontaneous communication from the "selected" terminals to further devices upon request.

This means that the distribution principle is designed in a similar manner to the viral distribution principle. In addition use is made of the fact that spontaneous short-range communication links are being provided for ever more mobile telephones.

The basic idea behind the inventive data distribution is to send an updated set of parameters or a new configuration to a critical and well-distributed mass of devices by making use of the known device positions. The position of a cell in which the mobile radio device is located is suitable for use as the device position for example.

It is to be assumed that the users are moving within the cell and if necessary leaving the cell. If the users continually spontaneously communicate with neighboring users, the "message" or new configuration is spread in this way. To this end the terminals must obviously be designed to request the message from other terminals or to forward it to other devices. Bluetooth, WLAN, wireless USB etc. are suitable as connection technologies for example.

Security is also of the utmost significance for spontaneous communication. It must be ensured that the data originates from an authentic source. To this end for example each connection and each data exchange between terminals can be protected by a recognized signature of the provider or operator or of the manufacturer.

In an advantageous manner the inventive method can be executed at two different logical levels: The operator level and the terminal level. This means that operator-specific data of the network operators can be distributed at the operator level. On the other hand manufacturer or terminal-specific data can be distributed at the terminal level.

Regardless of the distribution level, the inventive method can be used both for simple parameters and also for complex data.

In the example depicted in the FIGURE the operator 0 makes a data set available which is to provide a new configuration for the users A to J of a mobile radio network.

The data set is symbolized in the FIGURE by a rectangle. It is distributed virally to all users A to J. In the actual example the operator 0 sends the data set to a send station S1 and a send station S2 in each case (solid arrows in the FIGURE). For simplicity's sake only two send stations, which each supply one cell for example, are shown. The send station S1 sends the data set to a user or to a terminal E over the data network (also shown by a solid arrow). In the same way the send station S2 sends the data set to a user A. Further users of the network check for example at regular intervals whether current configuration data is available. To do this they establish spontaneous communication links to neighboring users or terminals. In the actual case shown here the users B, C and D establish spontaneous communication with user A and the users F and G with the user E respectively. They request the relevant users A or E to send them current data records. Since both users A and E have the current data sets available, they can transmit the current data sets to the requesting users B, C, D, F and G.

Naturally the requirements can differ. If for example the requesting user F has a different software version to the requesting user G, it is necessary as a rule for the two to request different data sets from the user E. To this extent the data which the operator sends to the first user E does not have to match the data which the user F or the user G or the user E requests.

The requirement for the distribution of the data set is that the individual users are moving, as has already been explained above. In the example shown here user A is moving to a position A' (dashed-line arrow in the FIGURE). At this location he moves into the vicinity of users H, I and J, who establish a short-range spontaneous communication link to him. Using these connections, the users H, I and J submit their requests and the user A or A' also transmits the data records or parts thereof to these users H, I and J.

The data set is thus distributed in accordance with the invention by a user who possesses the data set to be distributed, passing this on at the request of neighboring users. If the user addressed by the spontaneous communication does not have the requested data set available, he will request the data set from the next user coming into his vicinity.

The trigger for the request can occur for example by polling being undertaken at regular intervals. The polling can however also be undertaken more frequently, on a specific date if necessary. The least energy-saving method would be to always make a request when a connection is established via an ad-hoc network.

LIST OF REFERENCE SYMBOLS

A-J Users
A' User at new position
0 Operator
S2, S2 Send stations

The invention claimed is:

1. A method for distributing data in a data network including a plurality of users each of the users having a terminal, each terminal containing a software program that can be updated as desired by a network administrator, the plurality of users including ad-hoc networking capabilities, the method comprising:
   sending software update data from a central location to a first user of the plurality of users;
   establishing a first spontaneous communication link between the first user to a second user of the plurality of users;
   requesting a first data set of the software update data from the first user by the second user;
   establishing a second spontaneous communication link between the first user to a third user of the plurality of users;
   requesting a second data set of the software update data from the first user by the third user; and
   wherein the software update data, the first data set, and the second data set are each a complete data set such that an installation or a setup can be started in a terminal of at least one of the first user, the second user, and the third user once the software update data, the first data set, or the second data set is received by a terminal of a respective one of the first user, the second user, and the third user; and
   wherein the first data set is different data set than the second data set.

2. The method as claimed in claim 1, wherein the first data set is a first software version of the software update data and the second data set is a second software version of the software update data.

3. The method as claimed in claim 1, further comprising establishing a third spontaneous communication link between the second user and a fourth user of the plurality of users and requesting the first data set of the software update data from the second user by the fourth user, wherein the requesting of the first data set of the software update data from the first user by the second user takes place in a first location of the data network, and wherein the requesting of the first data set of the software update data from the second user by the fourth user takes place in a second location of the data network.

4. The method as claimed in claim 3, further comprising the second user checking whether the first data set is available in response to the requesting of the fourth user, and if the first data set is not available, the method further comprising the second user establishing a fourth spontaneous communication link between the second user and an additional user of the plurality of users that is within a vicinity of the second user.

5. The method as claimed in claim 1, wherein the first or the second spontaneous communication link is established via Bluetooth, wireless USB or WLAN.

6. The method as claimed in claim 1, further comprising checking the first spontaneous communication link and the second spontaneous communication link with a security facility.

7. The method as claimed in claim 6, further comprising the security facility transmitting a signature of the central location or of a device manufacturer during the establishing of the first and the second spontaneous communication link.

8. The method as claimed in claim 1, wherein the first data set and the second data set of the software update data comprises operator specific data of the network administrator or terminal-specific data.

9. The method as claimed in claim 1, further comprising triggering the requesting of the first data set of the software update data and the requesting of the second data set of the software update data by polling each terminal of the plurality of users, and wherein the polling takes place at a predetermined interval.

10. The method of claim 1, further comprising the first user checking whether the first data set or the second data set is available in response to the requesting of the first data or the requesting of the second data set.

11. A data network, comprising:
a plurality of users comprising a first user, a second user, and a third user each having ad-hoc networking capabilities and each of the plurality of users having a terminal, each terminal comprising a software program that can be updated as desired by a network administrator;
a central facility for distributing software update data to the first user;
a first spontaneous communication link established between the first user and the second user;
a second spontaneous communication link established between the first user and the third user;
a first request by the second user to the first user to transfer a first data set of the distributed software update data from the first user to the second user via the first spontaneous communication link; and
a second request by the third user to the first user to transfer a second data set of the distributed software update data from the first user to the third user via the second spontaneous communication link; and
wherein the distributed software update data, the first data set, and the second data set are each a complete data set such that an installation or a setup can be started in at least one terminal of the first user, the second user, and the third user once the distributed software update data, the first data set, or the second data set is received by a respective terminal; and
wherein the first data set is different than the second data set.

12. The data network as claimed in claim 11, wherein the first data set is a first software version of the distributed software update data and the second data set is a second software version of the distributed software update data.

13. The data network as claimed in claim 11, further comprising a third spontaneous communication link established between the second user and a fourth user of the plurality of users and a third request by the fourth user to the second user to transfer the first data set of the distributed software update data from the second user to the fourth user via the third spontaneous communication link, wherein the first spontaneous communication link takes place in a first location, and wherein the third spontaneous communication link takes place in a second location.

14. The data network as claimed in claim 13, wherein the second user checks whether the first data set is available in response to the third request by the fourth user, and if the first data set is not available, the data network further comprising a fourth spontaneous communication link established between the second user and an additional user of the plurality of users that is within a vicinity of the second user.

15. The data network as claimed in claim 11, further comprising a security facility that checks the first and the second spontaneous communication links.

16. The data network as claimed in claim 15, wherein the security facility transmits a signature of the central facility or of a device manufacturer when either the first spontaneous communication link or the second spontaneous communication link is established.

17. The data network as claimed in claim 11, wherein a terminal of the first user checks whether the first data set or the second data set is available in response to the first request or the second request.

18. The data network as claimed in claim 11, wherein the first or the second spontaneous communication link is established via Bluetooth, wireless USB or WLAN.

19. The data network of claim 11, wherein the first data set and the second data set of the distributed software update data comprises operator specific data of the network administrator or terminal-specific data.

20. The data network of claim 11, wherein at least one of the first request and the second request is triggered by polling each terminal of the plurality of users, and wherein the polling takes place at a predetermined interval.

* * * * *